United States Patent [19]

Shimizu et al.

[11] 4,160,241
[45] Jul. 3, 1979

[54] ELECTROCHROMIC DISPLAY DEVICE

[75] Inventors: Shotaro Shimizu, Kunitachi; Toyoharu Fujikawa, Iruma, both of Japan

[73] Assignee: Citizen Watch Co., Ltd., Tokyo, Japan

[21] Appl. No.: 788,823

[22] Filed: Apr. 19, 1977

[30] Foreign Application Priority Data

Apr. 20, 1976 [JP] Japan ............................... 51-45172
Oct. 9, 1976 [JP] Japan ............................. 51-107917

[51] Int. Cl.$^2$ .............................................. G09F 9/32
[52] U.S. Cl. ................................. 340/763; 350/357; 340/785; 340/812
[58] Field of Search .............. 340/324 R, 324 M, 336, 340/378 R, 166 EL; 350/160 R, 160 P, 357

[56] References Cited

U.S. PATENT DOCUMENTS

| 3,096,271 | 7/1963 | Hespenheide | 340/378 R |
|---|---|---|---|
| 3,339,996 | 9/1967 | Zaromb | 340/324 R |
| 3,443,859 | 5/1969 | Rogers | 340/324 R |
| 4,057,739 | 11/1977 | Otake | 350/160 R |

*Primary Examiner*—Marshall M. Curtis
*Attorney, Agent, or Firm*—Koda and Andro

[57] ABSTRACT

An electrochromic display device comprising a plurality of segment electrodes which are selectively driven by a driving circuit via a plurality of lead members so as to display patterns of uniform density. Each of the segment electrodes is designed such that their areas are substantially uniform. In addition, for those segment electrodes which differ in size, the output impedance of the driving circuit is adjusted. Moreover, the electrical resistance of each lead member is substantially equalized and the drive is controlled in proportion to the number of segment electrodes driven simultaneously.

8 Claims, 14 Drawing Figures

4,160,241

ELECTROCHROMIC DISPLAY DEVICE

BACKGROUND OF THE INVENTION

1. Field of Invention

The present invention relates to electrochromic display devices and more particularly to electrochromic display devices consisting of a plurality of segments which are selectively driven to display various patterns.

2. Prior Art

Image display devices using materials which produce coloration as a result of electrochemical oxidation reduction processes, such as electrochromic materials, are well known in the art. Display devices using inorganic oxides, such as, for example, tungsten oxide, molybdenum oxide and the like, as electrochromic material, are disclosed, for example, in U.S. Pat. No. 3,827,784. Display devices using organic dies such as, for example, viologen, are disclosed in U.S. Pat. No. 3,806,229. These electrochromic display devices require more electrical energy in order to produce or erase coloration than that required for driving liquid crystal display devices. However, once an image is displayed, it is maintained without further energy consumption because electrochromic display devices possess memory action. Thus, their average energy consumption is about equal to that required in driving liquid crystal display devices. Moreover, good legibility is obtained in the electrochromic display device since display contrast does not rely on visual angles. The electrochromic display device, therefore, is a suitable display device for electronic timepieces, calculators and the like. Electronic timepieces using electrochromic display devices are disclosed in U.S. Pat. Nos. 3,839,857 and 3,950,936. Such electronic timepieces display numbers by selectively driving display electrodes made up of a plurality of segments so as to produce coloration in a selected combination of segments.

Because coloration in electrochromic display devices is an electrochemical reaction, color density is proportional to the quantity of electricity flowing in the display electrode per square area. Thus, if many segments are driven simultaneously at a specified voltage for a specified period of time, each segment would have a different color density depending on the size of the segment and/or the number of segments that are driven simultaneously. Such a result would greatly impair the legibility of the display.

SUMMARY OF THE INVENTION

Accordingly, it is a general object of the present invention to provide an electrochromic display device capable of displaying various patterns with uniform color density irrespective of the size of the display electrode segments or the number of simultaneously driven electrode segments.

In keeping with the principles of the present invention, the objects are accomplished by a unique electrochromic display device comprising a plurality of segment electrodes which are selectively driven by a driving circuit via a plurality of lead members so as to display patterns of uniform density. With such an electrochromic device, the driving conditions are controlled in proportion to the size of the segment that are simultaneously being driven. The driving conditions are controlled by either equalizing the size of the individual segments or by adjusting the output impedance of each driving circuit in proportion to the individual segment areas. After the driving conditions are selected, either an appropriate driving time is selected in proportion to the number of simultaneously driven segments or the output impedance of the common driving circuit is varied.

In addition, in such an electrochromic display device, since the individual lead members coupled to the display segments of the display are of different length, the widths of the lead members thereof are selected such that the electrical resistance among the lead members is substantially equalized. Moreover, long and narrow segments are combined with short and wide segments in order to equalize the segment areas and to obtain electrode patterns which display highly legible characters.

BRIEF DESCRIPTION OF THE DRAWINGS

The above mentioned and other features and objects of the present invention will become more apparent by reference to the following description taken in conjunction with the accompanying drawings wherein like reference numerals denote like elements, and in which.

DETAILED DESCRIPTION OF THE INVENTION

Figure 1:
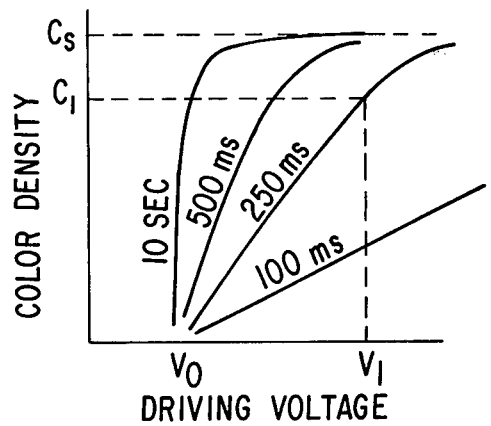
FIG. 1 is a graphic representation of the response characteristics of a typical electrochromic display device showing the relationship between color density and driving voltage for a plurality of driving times.

Referring to FIG. 1, shown therein is the relationship between color density and driving voltage for a plurality of driving times utilizing a typical electrochromic display device. As shown in FIG. 1, coloration begins when the driving voltage exceeds the threshold value $V_0$ and reaches saturation coloration density $C_s$ after a long period of time. However, coloration is unable to reach saturation coloration density $C_s$ when the driving time is brief and therefore only an intermediate coloration occurs. In FIG. 1, respective color densities are shown when the driving times are 10 seconds, 500 milliseconds, 250 milliseconds and 100 milliseconds. It is clear from FIG. 1 that the color density increases as higher driving voltage is required for a longer time, although from the point of view of durability of the display device and power consumption, it is more desirable to have a lower driving voltage. On the other hand, from the point of view of display legibility, high coloration density is desirable. Moreover, in order to switch the display momentarily, a response speed of, for example, 250 milliseconds, is required. Ultimately, these requirements must be taken into consideration in setting the most suitable driving voltage $V_1$ and driving time (for example, 250 milliseconds) such that the display will have a color density $C_1$ that is lower than the saturation coloration density $C_s$ (for example, 80 percent of $C_s$).

Figure 2:
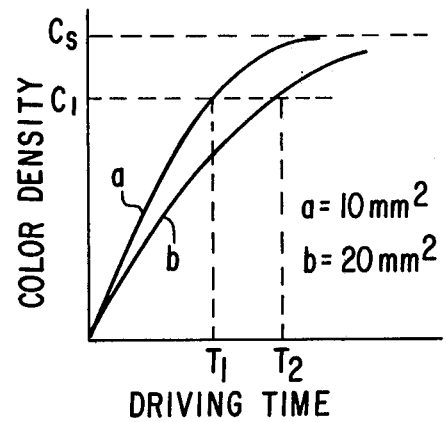
FIG. 2 is a graphical representation illustrating the response characteristics of a typical electrochromic display device showing the relationship between color density and driving time for two display electrode segments of different areas.

FIG. 2 illustrates the relationship between color density and the driving time when a specific driving voltage (for example, $V_1$) is applied to two display electrodes of different areas, 10 square millimeters and 20 square millimeters, respectively. As the size of the display electrodes increases, the electrical resistance between the counter electrodes decreases. The resultant increase in current causes the output impedance of the driving circuit to drop significantly such that the effective voltage between the electrodes is lowered. As a result, the response speed of the display electrode with a large area slows down such that the time required to reach a prescribed color density $C_1$ is $T_1$ and $T_2$, respectively, as shown in FIG. 2. In other words, a delay in response speed caused by an increase in display area is clearly evident when the area is enlarged twice as much.

It should be apparent to one skilled in the art that the driving response described above with respect to the coloration process applies equally to the decoloration process.

Figure 3:
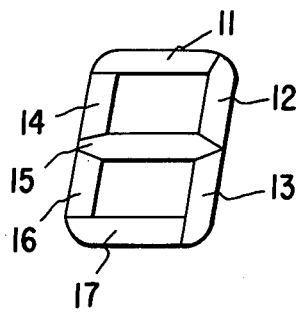
FIG. 3 is a seven-segment display electrode segment pattern of the prior art.

In FIG. 3 is shown a segment type display electrode pattern commonly used in prior art luminous and liquid crystal display devices. Seven independently driven segments 11 through 17 are arranged in the shape of an eight. Each segment is driven selectively in an appropriate combination to display any number from 0 to 9. Particular consideration is given to the legibility of each numerical form in designating this electrode pattern in such a way that three horizontal segments 11, 15 and 17 extend as far as the left hand edge while two vertical segments 12 and 13 extend from top to bottom. As a result, the longest segments 11, 15 and 17 and the shortest segments 14 and 16, have a ratio of about 2 to 1. Because all the segments are of uniform width, the ratio of areas is also approximately 2 to 1. To drive the segments under the same conditions would create undesirable results in that the short segments would produce dark coloration while the long segments would produce light coloration.

Figure 4A:
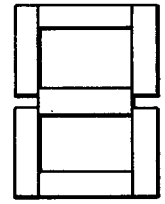
FIGS. 4a and 4b is a display electrode segment pattern in accordance with the teachings of the present invention.
Figure 4B:
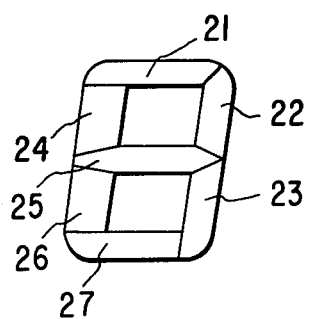

Referring to FIG. 4, shown therein are examples of segmented display electrode patterns of electrochromic display devices in accordance with the teachings of the present invention. FIG. 4(a) shows an arrangement of seven segments having a uniform shape whereas FIG. 4(b) illustrates a pattern designated to emphasize the legibility of the characters. In the later pattern of FIG. 4(b), the width of the long segments 21, 25 and 27 is narrower than the width of the short segments 24 and 26 such that the area of each segment is substantially the same. Using such segmented display electrodes enables all the segments to produce uniform coloration by applying uniform driving conditions, although in some display devices, segments may not always be of the same size.

Figure 5:
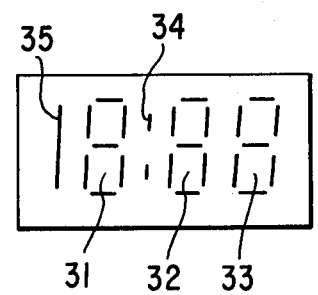
FIG. 5 illustrates a display electrode segment pattern in an electronic watch displaying hours and minutes.

Referring to FIG. 5, shown therein is a display electrode pattern using electrochromic display devices for electronic timepieces. In such a device, there are 24 segments arranged in the shape of 18:88 to show hours and minutes in numerical figures. In this pattern, three digits, 31, 32, 33 comprise seven segments of equal size while the area of the colon 34 is approximately one-half the size of any other segments and the area of the display electrode 35 designating the tens digit of the hour is approximately twice as large as any other segment. In such cases where segment sizes differ, uniform color density is obtained by varying the output impedance of the respective driving circuit in proportion to the segment size.

Figure 6:
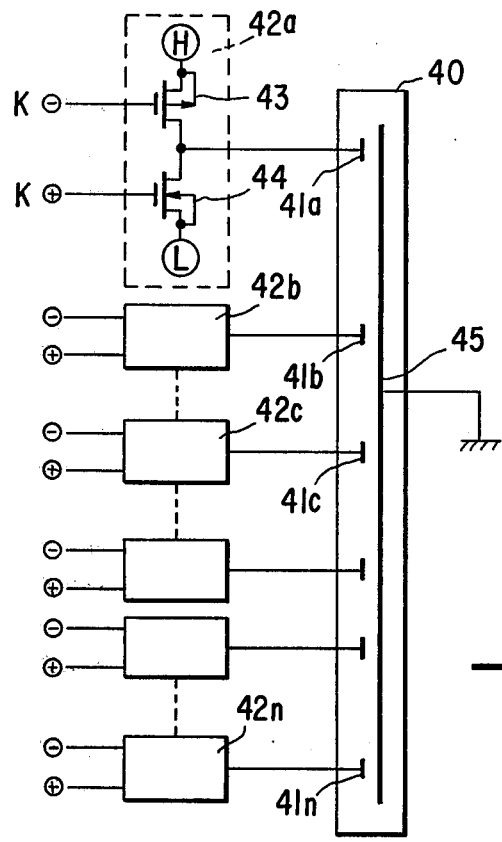
FIG. 6 illustrates a driving circuit utilized with a display device requiring double power sources.

Referring to FIG. 6, shown therein is a driving circuit for an electrochromic display device having double power sources on two levels "H" and "L", corresponding to the high and low levels. Within the electrochromic display cell 40 a number of segments electrodes 41a through 41n are arranged such that each segment electrode has its own driving circuit 42a through 42n. The driving circuit 42a is comprised of two field effect transistors (FET) wherein segment electrode 41a is coupled to the power source at a level H via p-channel FET 43 and to the power source at level L via n-channel FET 44. Driving circuit 42b through 42n are similarly configured. When an output signal of level H is received at the K+ terminal, FET 44 becomes "ON" causing segment electrode 41a to change to level L whereupon the current is caused to flow from a common electrode 45 to segment electrode 41a thereby producing coloration. On the other hand, when an erase signal of level L is received at the K− terminal, FET 43 turns "ON" causing segment electrode 41a to switch to level H whereupon current flowing from segment electrode 41a to common electrode 45 causes the coloration to disappear.

Figure 7A:
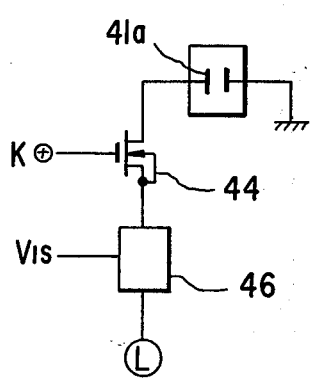
FIGS. 7a and 7b illustrate driving circuits in accordance with the teachings of the present invention wherein the output impedence is adjusted.
Figure 7B:
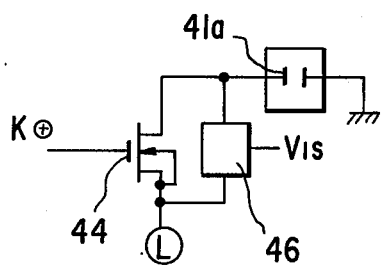

Should the size of the segment electrode 41a be different from the size of other segment electrodes, uniform coloration is obtained by adding a suitable impedence element to the driving circuit 42a. For example, in the case where the area of the segment electrode 41a is small, an impedance element 46 (as shown in FIG. 7a) may be coupled between the power source L and the segment electrode 41a in line with FET 44 so as to prevent an overflow of current. For the case where the area of the segment electrode 41a is large, an impedance element 46 may be coupled in parallel (as shown in FIG. 7b) so as to enable a sufficient flow of current. Although the driving circuit for H power source is not shown in FIG. 7, its impedence may be similarly adjusted.

In the circuits of FIGS. 7a and 7b an FET similar to FET 44 may be used as the impedence element 46. In such a case the input signal terminal $V_{is}$ can be coupled to the K+ terminal. While the above explanation pertains to instances wherein the output impedence of the driving circuit 42 is either increased twice as much or reduced in half, it is possible to use any desired number of impedance elements 46 to obtain any desired characteristics. Moreover, if FET's are used, the impedance may be adjusted proportional to a level of the input signal $V_{is}$ thereby enabling the output impedance of the driving circuit to be adjusted with respect to any segment electrode with any desired area.

Figure 8A:
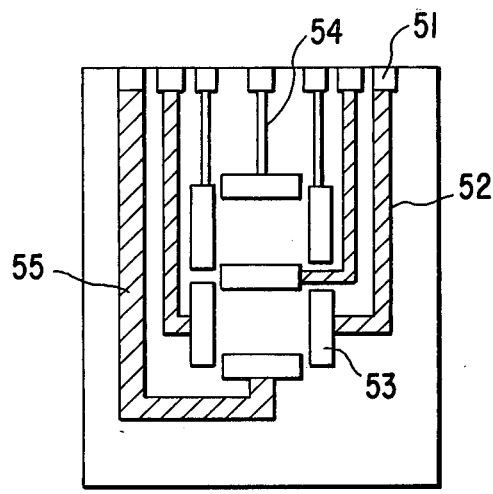
FIGS. 8a and 8b illustrate a display in accordance with the teachings of the present invention wherein the lead members are configured to have uniform electrical resistance.

In addition, in order to drive a plurality of segment electrodes to a uniform color density, it is not sufficient simply to equalize the size of the segment electrodes nor adjust the output impedance of the driving circuit in proportion to the size. Specifically, if a transparent electrode material such as tin oxide, indium oxide or the like is used as the segment electrode material, the electrical resistance of the lead member of the segment electrode has an effect upon the response speed. As shown in FIG. 8(a), a segment electrode is made up of a terminal member 51, a lead member 52 and a display member 53. When tin oxide, for example, having a sheet resistance of 100 ohms per square area, is used as the transparent electrode material, the electrical resistance of a lead member is typically in the order of 1 to 5 kilo-ohms, a value which cannot be ignored when compared with the electrical resistance of the driving circuit. Because the length of the lead member 52 differs from one segment electrode to the other (as shown in FIG. 8), each lead member has a different electrical resistance if the lead members are of a uniform width and therefore each segment electrode will display a different response characteristic.

Figure 8B:
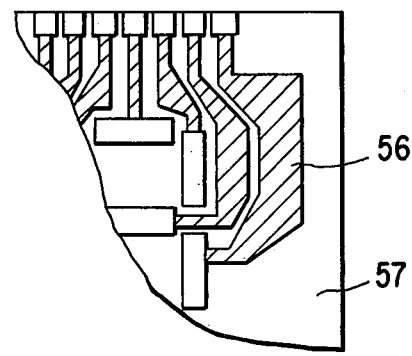

Accordingly, in the electrochromic display in accordance with the teachings of the present invention shown in FIG. 8(a), the width of the shorter lead member 54 is designed to be narrower than the width of the longer lead member 55 such that the electrical resistance in all the lead members is substantially the same. As a result, all of the segment electrodes show a uniform response characteristic. Another embodiment for the lead members of the electrochromic display in accordance with the teachings of the present invention is shown in FIG. 8(b). In FIG. 8(b) the lead members 56 are in a more complex form and are designed to produce a uniform effective value of electrical resistance in all of the lead members. The lead member pattern in FIG. 8(b) designed to lower the overall electrical resistance of the lead members by effectively taking advantage of all of the area of the electrode substrate 57.

Figure 9:
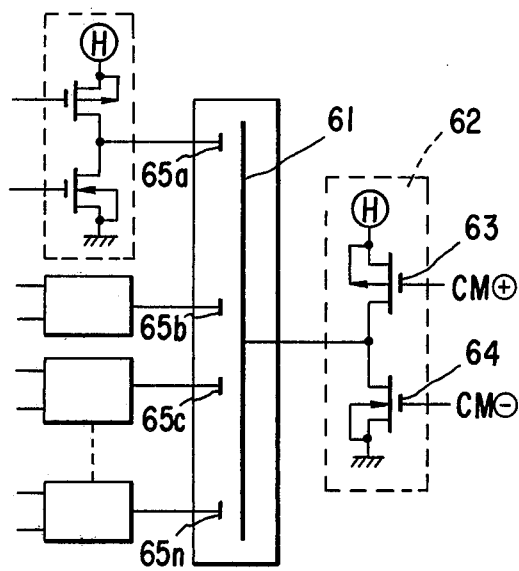
FIG. 9 illustrates a driving circuit utilized with an electrochromic display device requiring a single power source.

A driving circuit for an electrochromic display device having two power sources on two levels "H" and "L" has been previously shown in FIG. 6. There are, however, instances in which a driving method using a single power source is more desirable, as, for example, in an electronic watch. Shown in FIG. 9 is a driving circuit for an electrochromic display device utilizing a single power source. This driving circuit differs from the circuit shown in FIG. 6 in that a common driving circuit 62 is provided with the common electrode 61. The common driving circuit 62 enables the common electrode 61 to be coupled, via FET 63 or FET 64, to either the power source on level H or to ground, thereby switching the polarity of the common electrode 61. In this driving method, even though the areas of the segment electrodes 65a through 65n are uniform, the number of segment electrodes which are driven simultaneously would change the amount of current flowing in the common driving circuit 62 and thereby affecting the output impedance of FET 63 and FET 64 and hence causing variations in response characteristics. Accordingly, when the number of simultaneously driven electrodes is great, the color density produced after a specific period of driving time will be light and when the number is small the color density will be dark. In order to eliminate this irregularity, it is necessary to control the driving conditions in proportion to the total area of the segment electrodes that are driven simultaneously.

In such a case, if all of the segment electrodes are of a uniform size, the driving conditions can be controlled by the number of segment electrodes that are driven simultaneously.

Figure 10:
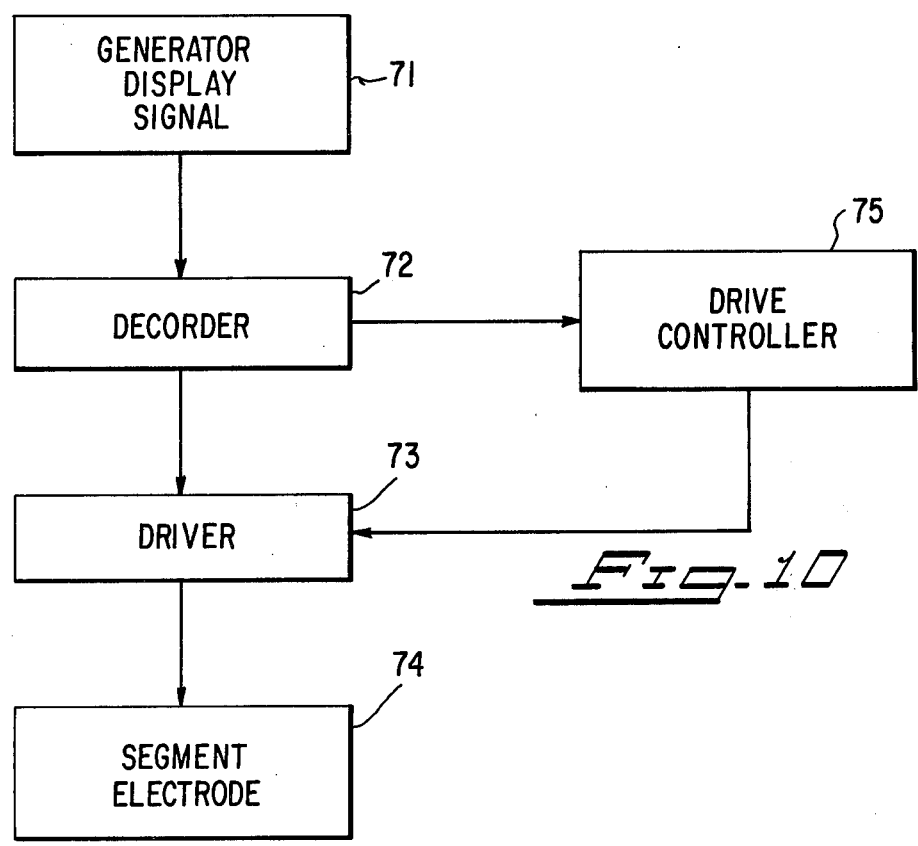
FIG. 10 is a block diagram illustrating the operation of a display device in accordance with the teachings of the present invention.

FIG. 10 is a block diagram of an electrochromic display device of the present invention. Display signals from a display signal generator circuit 71 are decoded by decoder 72. The signals then pass through driving circuit 73 which selectively drives segment electrode 74 to display various patterns. A driver controller circuit 73 picks out the number of segment electrodes being driven simultaneously and controls the time in proportion to the number of simultaneously driven segment electrodes.

Control of the drive is achieved by either varying the driving time in proportion to the number of simultaneously driven segments or by varying the output impedence of the common driving circuit.

Figure 11:
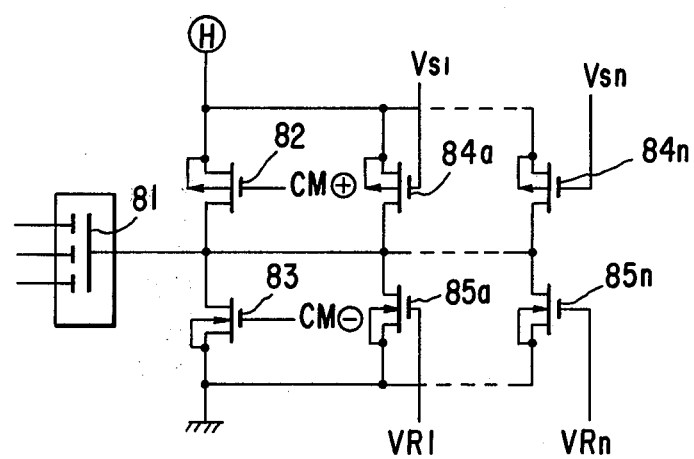
FIG. 11 illustrates a common driving circuit in accordance with the teachings of the present invention wherein the output impedence is variable.

FIG. 11 shows a common driving circuit in accordance with the teachings of the present invention in which a common electrode 81 is coupled to power source H or to ground via FET 82 or FET 83, which are in turn coupled to impedance elements 84a through 84n or 85a through 85n in a parallel configuration as shown. These impedance elements are selectively switched to "ON" by driving signals Vsl through Vsn or Vrl through VRn. The signals Vsl through Vsn and VRl through VRn are generated by a driver controller circuit 75. Thus the output impedence of the common driving circuit is controlled in proportion to the number of segment electrodes that are simultaneously driven.

Furthermore, in order to vary the driving time in proportion to the number of segment electrodes, a preset counter may be used to change the number of driving voltage pulses or the length or duty cycle of the pulses. Such counters are well known in the art.

As described hereinabove, the electrochromic display device of the present invention is useful as a data display device for electronic watches, calculators and the like since the various patterns can be displayed with a uniform color density by selectively driving the display electrode segments in the manners previously described.

In all cases it is understood that the above described embodiments are merely illustrative of but a few of the many possible specific embodiments which can represent the applications of the principles of the present invention. Numerous and varied other arrangements can be readily devised by those skilled in the art without departing from the spirit and scope of the invention.

We claim:

1. Electrochromic display device utilizing electrochromic material capable of producing reversible coloration by means of an electrochemical oxidation-reduction and memory action, said display comprising:
   display electrodes made up of a plurality of segment electrodes, said segment electrodes being selectively driven to display various patterns; and
   a means for suitably controlling the driving conditions in proportion to the area of said segment electrodes such that each of said segment electrodes is driven to produce a uniform color density at all times.

2. The device according to claim 1 wherein said plurality of segment electrodes comprise segment electrodes of different sizes and said drive control means comprises a driving circuit for each of said segment electrodes configured such that the value of the output impedance is automatically adjusted in proportion to the area of each of said segment electrodes.

3. The device according to claim 1 wherein means are provided for controlling the driving conditions in proportion to the total number of segment electrodes to be driven simultaneously.

4. The device according to claim 3 wherein said drive control means comprises a common driving circuit and the value of the output impedance of said common driving circuit is varied in proportion to the total number of segment electrodes to be driven simultaneously.

5. The device according to claim 1 wherein the driving time is varied in proportion to the total number of segment electrodes to be driven simultaneously.

6. The device according to claim 1 wherein the areas of all of said segment electrodes are substantially equal.

7. The device according to claim 1 further comprising lead members coupled to said segment electrodes, said lead members having electrical resistance values which are substantially equal.

8. The device according to claim 7 wherein said lead members are of substantially different widths whereby said electrical resistance values are maintained substantially equal.